United States Patent [19]

Yoshida et al.

[11] Patent Number: 5,009,978

[45] Date of Patent: Apr. 23, 1991

[54] PREPARATION PROCESS FOR TONER POLYMER

[75] Inventors: Keiji Yoshida; Ryo Funato; Syuji Takahiro, all of Nagoya; Shinji Kubo, Toyohashi; Notoshi Inagaki, Nogoya, all of Japan

[73] Assignee: Mitsubishi Rayon Co., Ltd., Tokyo, Japan

[21] Appl. No.: 447,854

[22] Filed: Dec. 8, 1989

[30] Foreign Application Priority Data

Dec. 12, 1988 [JP] Japan .................................. 311989

[51] Int. Cl.$^5$ .......................... G03G 9/00; G03G 5/00
[52] U.S. Cl. ..................................... 430/109; 430/137
[58] Field of Search ................................ 430/109, 137

[56] References Cited

U.S. PATENT DOCUMENTS 4,415,644  11/1983  Tamaki et al. ...................... 430/137

Primary Examiner—Marion E. McCamish
Assistant Examiner—Stephen C. Crossan
Attorney, Agent, or Firm—Oblon, Spivak, McClelland, Maier & Neustadt

[57] ABSTRACT

A process for the preparation of a toner polymer which comprises the steps of carrying out suspension polymerization of a monomer having a polymerizable vinyl group in the presence of polyvinyl alcohol as a dispersant, and then conducting oxidative decomposition of polyvinyl alcohol anchored to polymer particles obtained by suspension polymerization.

7 Claims, No Drawings

PREPARATION PROCESS FOR TONER POLYMER

BACKGROUND OF THE INVENTION

1. Field of the Invention

The present invention relates to a process for the preparation of a toner polymer, and more particularly to a preparation process for a toner polymer which is excellent in moisture resistance, can maintain constant electrostatic friction over a long period and has a long service life.

2. Description of the Prior Art

Many inventions on the preparation of polymers for dry toners have been conventionally conducted. The preparation processes include suspension polymerization, bulk polymerization, desolvation after solution polymerization and salting-out after emulsion polymerization. Suspension polymerization is the most excellent process in economy.

In conventional suspension polymerization using a dispersant, the dispersant remains to a certain degree by anchoring on the surface of polymer particles, even though washing it thoroughly carried out after polymerization. When a toner is prepared by using these polymer particles as a raw material, the remaining dispersant causes an adverse effect on such toner properties as moisture resistance, stability of electrostatic charge and fixing ability. Hence the dispersant leads to problems in the deterioration of image quality in the case that the toner is used at increased temperatures or high humidity and the number of duplications cycles is increased.

This tendency can be somewhat overcome by using a nonionic dispersant in place of an anionic or cationic dispersant used in suspension polymerization. Improvements to date, however, have been unsatisfactory.

SUMMARY OF THE INVENTION

An object of this invention is to provide a low cost preparation process for a toner polymer containing almost no dispersant.

Another object of this invention is to provide a toner which is excellent in moisture resistance and electrostatic charge stability and capable of retaining a good image quality over a long period even when recycled.

The above objects of the present invention can be achieved by providing a process for the preparation of a toner polymer comprising the steps of: carrying out suspension polymerization of a monomer having a polymerizable vinyl group in the presence of polyvinyl alcohol as a dispersant; and conducting oxidative decomposition of said polyvinyl alcohol anchored to polymer particles obtained by said suspension polymerization.

DESCRIPTION OF THE PREFERRED EMBODIMENTS

Any type of monomer which has a polymerizable vinyl group can be used for the process of this invention, so long as the monomer can conduct radical polymerization in a suspended state. Exemplary monomers suitable for use include styrene, α-methylstyrene and styrene derivatives having substituents such as the o-methyl group, m-methyl group, p-methyl group, p-ethyl group, 2,4-dimethyl group, p-butyl group, p-hexyl group, p-octyl group, p-nonyl group, p-decyl group, p-methoxy group and p-phenyl group; α-fluoroacrylic acid esters and (meth)acrylic acid esters represented by the formula; $CH_2=CR\text{-}COOR'$, wherein R is a hydrogen atom, fluorine atom or methyl group and R' is a monovalent group such as a methyl group, ethyl group, n-propyl group, isopropyl group, n-butyl group, isobutyl group, sec-butyl group, tert-butyl group, n-pentyl group, n-hexyl group, n-octyl group, 2-ethylhexyl group, n-nonyl group, isononyl group, decyl group, dodecyl group, tridecyl group, stearyl group, docosyl group, cyclohexyl group, benzyl group, phenyl group, methoxyethyl group, ethoxyethyl group, butoxyethyl group, fluoroalkyl group and phenoxyethyl group; vinyl esters such as vinyl acetate and vinyl propionate; and acrylic acid derivatives and methacrylic acid derivatives such as acrylonitrile and methacrylonitrile. The monomer may be used singly or in combination.

Representative examples of two or more monomers include monomer mixtures containing such principal components as styrene and/or derivatives thereof, and alkyl (meth)acrylates and/or α-fluoroacrylic acid esters.

No particular restriction is imposed on the polymerization initiator for use in the suspension polymerization of this invention. Known initiators which may be used include, for example, di-tert-butyl peroxide, tert-butyl cumyl peroxide, dicumyl-peroxide, acetyl peroxide, isobutyryl peroxide, octanoyl peroxide, decanoyl peroxide, lauroyl peroxide, 3,5,5-trimethylhexanoyl peroxide, benzoyl peroxide, m-tolyl peroxide, tert-butylperoxy acetate, tert-butylperoxy isobutyrate, tert-butylperoxy pivalate, tert-butylperoxy neodecanoate, cumylperoxy neodecanoate, tert-butylperoxy 2-ethylhexanoate, tert-butylperoxy 3,5,5-trimethylhexanoate tert-butylperoxy laurate, tert-butylperoxy benzoate, tert-butylperoxy isopropyl carbonate, azobisisobutyronitrile and 2,2'-azobis-(2,4-dimethylvaleronitrile). These initiators may be used singly or in combination.

Preferred initiators among these compounds are octanoyl peroxide, decanoyl peroxide, lauroyl peroxide, benzoyl peroxide, m-toluyl peroxide and azobisisobutyronitrile, in view of prolonged activity during monomer polymerization and completion of polymerization in a relatively short time.

The dispersant to be used in suspension polymerization in the process of this invention may be any known dispersant such as completely saponified polyvinyl alcohol, partially saponified polyvinyl alcohol and modified polyvinyl alcohol. The polyvinyl alcohol is used in an amount required to complete polymerization without coagulation of formed polymer particles during polymerization. The amount is generally from 0.01 to 5 parts by weight, preferably from 0.05 to 2 parts by weight, per 100 parts by weight of water.

Additional dispersants which may be used in combination, if necessary, are electrolytes such as sodium chloride, potassium chloride, sodium sulfate and potassium sulfate.

Reaction conditions in the suspension polymerization of this invention are dependent on the kind of monomer to be polymerized and the kind and amount of polymerization initiator. The reaction temperature is generally from 50 to 130° C., preferably from 70 to 100° C., The reaction time is suitably from 1 to 10 hours.

The particle size of the polymer obtained by suspension polymerization is from 0.5 μm to 5 mm, preferably from 50 μm to 1 mm. The polymer particles obtained by suspension polymerization are generally poreless solids in the form of beads. Hence almost no polyvinyl alcohol is included in the interior of the polymer particles. In other words, bead-like particles are suitable for the polymer particles obtained by the suspension polymerization of this invention.

Ordinary post-treatment procedures such as cooling, washing and drying are carried out after completing polymerization. The above washing step is not necessarily required in the invention. However, it is preferred to carry out sufficient washing, because polyvinyl alcohol weakly adhering to the surface of the particles can be largely removed and the efficiency of the oxidizing agent can be enhanced in the subsequent oxidative decomposition step. On the other hand, polyvinyl alcohol anchored like a graft on the surface of the polymer particles cannot be removed by ordinary washing alone. Consequently, the oxidative decomposition step is effective as described below.

The oxidative decomposition step of anchored polyvinyl alcohol uses an oxidizing agent which is known to break the principal chain of polyvinyl alcohol by preferentially oxidizing and decomposing the 1,2-glycol bond. The oxidation treatment of the polymer particles may be carried out so long as the characteristics of the toner polymer are unimpaired.

Exemplary known oxidizing agents which can be used include, periodic acid, periodate, dichromate, permanganate, persulfate, hydrogen peroxide, cerium (IV) salt, thallium (III) salt, cobalt (III) salt and chloric acid.

No particular restriction is imposed on the oxidative decomposition step using the oxidizing agent so long as the principal chain of the polyvinyl alcohol can be broken in the step described above. For example, polymer particles may be added to a solution of the oxidizing agent and stirred at room temperature. When the treatment is carried out by using an aqueous solution of suitable oxidizing agents such as those illustrated above, the principal chain of anchored polyvinyl alcohol can be broken without impairing the characteristics required for the toner polymer. The polyvinyl alcohol is broken down to low molecular weight compounds, reduces the adhesion to the surface of polymer particles and readily dissolves in the aqueous solution of the oxidizing agent. The solvent for the oxidizing agent of this invention is preferably water or a water-base solvent, in view of the easy dissolution of the decomposed materials. The amount of the oxidizing agent for use in the above step depends on the kind of oxidizing agent and polyvinyl alcohol, and is preferably 0.01 part by weight or more per 100 parts by weight of polyvinyl alcohol.

No particular restriction is imposed on the concentration of the oxidizing agent in water or the water-base solvent. In general, the solution of the oxidizing agent is used in an approximate amount of 200 parts by weight per 100 parts by weight of the polymer particles. The amount of the solution of the oxidizing agent is preferably 100 to 300 parts by weight per 100 parts by weight of the polymer particles, viewed from the practical use. After finishing the oxidative decomposition step, conventional washing, dehydration and drying may be carried out, and the toner polymer is obtained.

The step for the preparation of the toner from the polymer can be carried out according to conventionally known methods. No particular limitation is placed on the methods. For example, the toner composition can be prepared by mixing and kneading the toner polymer with a desired amount of various additives for coloring and charge control. The toner composition thus obtained can, for example, be pulverized to provide the toner.

Exemplary additives which may be mentioned include carbon black, iron black, graphite, nigrosine, metal complexes of monoazo dyestuffs, ultramarine blue, phthalocyanine blue, Hanza yellow, benzidine yellow, and various lake pigments such as quinacridone pigments.

In the preparation of the toner, other common polymers may be used in combination with the polymer of this invention in an amount less than the latter polymer.

Exemplary common polymers which can be added include silicone resin, polyester, polyurethane, polyamide, epoxy resin, polyvinyl butyral, rosin, modified rosin, terpene resin, phenol resin, aliphatic or alicyclic hydrocarbon resin, aromatic petroleum resin, chlorinated paraffin and paraffin wax.

The toner can also contain magnetic fine particles including metals such as iron, manganese, nickel, cobalt and chromium; magnetite; hematite; various ferrites; manganes alloys and other ferromagnetic alloys. These fine particles may have an average particle size of 0.05 to 5 $\mu$m, preferably 0.1 to 2 $\mu$m. The content may be from 15 to 70% by weight, preferably from 25 to 45% by weight per total weight of the toner.

Additionally, the toner may contain from 10 to 40% by weight of a fluidity improver such as a hydrophobic colloidal silica. The fluidity improver may also be used by simply mixing with the powder of the resin composition in an amount of 0.5 to 5% by weight per weight of the resin composition.

The present invention will hereinafter be illustrated by way of examples.

Part means part by weight in the following description.

The term "fog" means a phenomenon wherein black spots appear in addition to printed characters on a copied paper or the image becomes lighter with an increase in duplication cycles.

EXAMPLE 1

In a monomer mixture containing 83 parts of styrene, 17 parts of 2-ethylhexyl acrylate and 0.3 part of divinylbenzene, 3 parts of benzoyl peroxide was dissolved as an initiator. The solution was added with stirring to a mixture containing 0.2 part of a partially saponified polyvinyl alcohol dispersant (GOSENOL GH-20 TM, a product of Nippon Synthetic Chemical Industry Co., Ltd.) in 220 parts of deionized water. The temperature was raised to 92° C. and then suspension polymerization was carried out for 90 minutes. The suspension obtained was cooled to room temperature, washed and dehydrated. The bead-like polymer particles thus obtained had a particle size of about 250 $\mu$m.

Subsequently, the above bead-like polymer particles were added to a solution containing $2 \times 10^{-4}$ part of sodium periodate dissolved in 200 parts of water and stirred at room temperature for an hour. Thereafter, the polymer particles were thoroughly washed, dehydrated and dried. The bead-like polymer particles which had anchored polyvinyl alcohol removed by oxidative decomposition were thus obtained.

A mixture of 92 parts of the polymer particles thus obtained, 7 parts of carbon black (#40 TM, a product of Mitsubishi Kasei Corp.) and 1 part of a charge controller (BONTRON S-34 TM, a product of Orient Kagaku Kogyo K.K.) was kneaded at 150° C. for 5 minutes with a twin screw extruder, cooled and pulverized with a jet mill. The resulting toner had particle sizes of 5 to 15 m.

The toner thus obtained was subjected to a duplication test by using a commercial copying machine (RICOPY FT-4510™, a product of Ricoh Co., Ltd.). A clear image having high resolution without fog could be obtained even after copying 20,000 sheets of paper.

The above toner was again added to the above copying machine and allowed to stand for 8 hours in an atmosphere having an increased temperature of 35° C. and a high relative humidity of 85%. Then the same duplication test was carried out and a clear image having high resolution without fog could be obtained.

EXAMPLE 2

Polymer particles were obtained, a toner was prepared and a duplication test was carried out by the same procedures as conducted in Example 1, except that $2 \times 10^{-5}$ part of sodium periodate was used. As a result, in a duplication test under ordinary conditions, a clear image having high resolution without fog could be obtained from the first to 10,000th sheet of paper. However, the image was very slightly fogged and resolution was somewhat lowered after duplicating 20,000 sheets of paper. Nevertheless, the deterioration caused no problem in practical use.

In the same duplication test conducted under increased temperature and high humidity, a good image quality was also obtained, although the image obtained was very slightly fogged. There was also no problem in practical use.

COMPARATIVE EXAMPLE 1

A toner was prepared and a duplication test was carried out by using the same procedures as conducted in Example 1, except that the oxidative decomposition step was omitted. As a result, in a duplication test under ordinary conditions, a clear image having high resolution without fog could be obtained in the initial stage of duplication. However, the image obtained after duplicating about 10,000 sheets of paper resulted in fogging and decreased in resolution.

In a duplication test conducted under increased temperature and high humidity, the image obtained was severely fogged and could not be used.

REFERENTIAL EXAMPLE 1

Polymer particles were obtained, a toner was prepared and a duplication test was carried out by the same procedures as conducted in Example 1, except that $2 \times 10^{-6}$ part (0.001 part per 100 parts of the above polyvinyl alcohol dispersant) of sodium periodate was used.

As a result, in the duplication test under ordinary conditions, a clear image having high resolution without fog could be obtained in the initial stage of duplication. However, the image obtained after duplicating 10,000 sheets of paper resulted in a certain amount of fog and decreased in resolution. In a duplication test conducted under increased temperature and high humidity, the image obtained was also fogged and decreased in resolution.

The results which were inferior to the examples to a certain degree are believed to result from the fact that oxidative decomposition was insufficient for polyvinyl alcohol anchored to the polymer particles.

What is claimed is:

1. A process for the preparation of a toner polymer comprising the steps of: carrying out suspension polymerization of a monomer having a polymerizable vinyl group in the presence of polyvinyl alcohol as a dispersant; and conducting oxidative decomposition of said polyvinyl alcohol anchored to polymer particles obtained by said suspension polymerization.

2. The process of claim 1 wherein said monomer is one or more monomers selected from the group consisting of styrene, styrene derivatives, α-fluoroacrylic acid esters, (meth)acrylic acid esters, vinyl esters, (meth)acrylic acids and (meth)acrylic acid derivatives.

3. The process of claim 1 wherein said polyvinyl alcohol is used in an amount of 0.01 to 5 parts by weight per 100 parts by weight of water used for suspension polymerization.

4. The process of claim 1 wherein the polymer particles are bead-like particles having a particle size of 0.5 m to 5 mm.

5. The process of claim 1 wherein the oxidative decomposition is conducted by adding the polymer particles to a solution of an oxidizing agent.

6. The process of claim 5 wherein the oxidizing agent is one or more oxidizing agents selected from the group consisting of periodic acid, periodate, dichromate, permanganate, persulfate, hydrogen peroxide, cerium (Iv) salt, thallium (III) salt, cobalt (III) salt and chloric acid.

7. The process of claim 5 wherein the amount of the oxidizing agent is 0.01 part by weight or more per 100 parts of the polyvinyl alcohol used in the suspension polymerization.

* * * * *